UNITED STATES PATENT OFFICE.

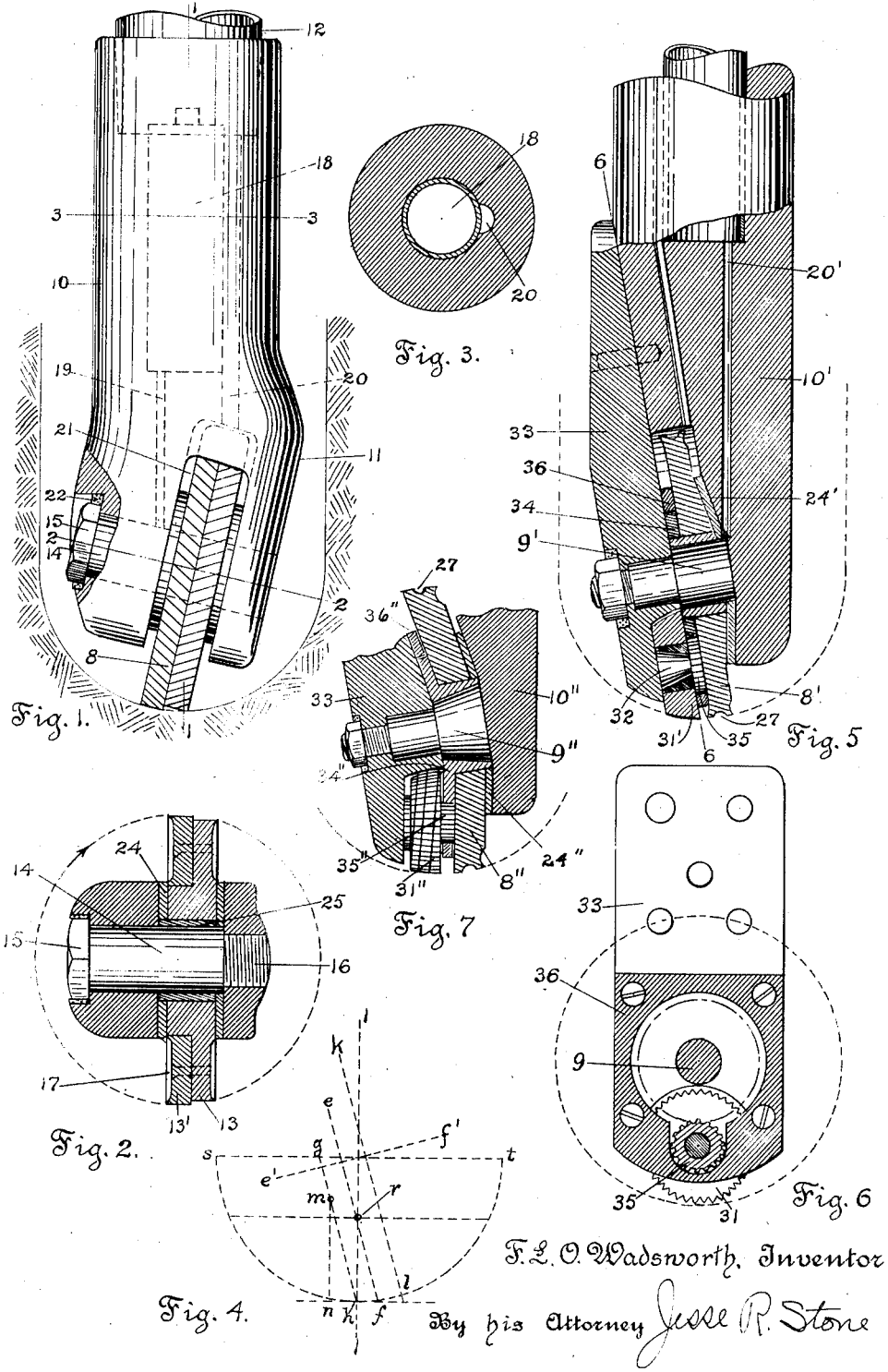

FRANK L. O. WADSWORTH, OF PITTSBURGH, PENNSYLVANIA, ASSIGNOR TO HUGHES TOOL COMPANY, OF HOUSTON, TEXAS, A CORPORATION OF TEXAS.

ROTARY BORING-DRILL.

1,388,497.   Specification of Letters Patent.   Patented Aug. 23, 1921.

Original application filed October 18, 1919, Serial No. 329,409. Divided and this application filed April 13, 1920. Serial No. 373,493.

*To all whom it may concern:*

Be it known that I, FRANK L. O. WADSWORTH, a citizen of the United States, residing at Pittsburgh, Pennsylvania, have invented a certain new and useful Improvement in Rotary Boring-Drills, of which the following is a full, clear, and exact description, such as will enable others skilled in the art to which it appertains to make and use the same.

My invention relates to rotary boring drills of the type described in my copending application, Ser. No. 329,409, which has since become Patent No. 1,365,134, issued Jan. 11, 1921, from which this application has been divided. This type of drill is designed for boring holes in earth, rock, or other material, and belongs to that general class of boring tools which are usually designated as disk drills or bits, and which are provided with one or more rotating and revolving members that are adapted to perform the joint functions of cutting or shearing away the material from the end of the bore cavity and then disintegrating and pulverizing the loosened detritus.

The main object of this invention is the production of a rotary disk drill consisting of a minimum number of parts and presenting a maximum degree of simplicity and ruggedness of construction. Another object of the invention is a provision of disk cutter members which will have a very effective cutting action; which will resist any rapid wear under severe conditions of operation; and which can when necessary, be replaced or renewed very quickly and at comparatively small expense. Another object is to so mount the cutting elements that a certain and regular rotation of the same may be obtained. A further object of my invention is to obtain a definite and positive centering of the drill in the hole which is being bored, and prevent any wabbling or lateral displacement of the cutting elements; and thereby minimize the danger of producing a crooked hole when drilling through irregular and non-homogeneous strata of the material. Further objects and advantages of the invention herein set forth will be obvious to those skilled in the art from the more detailed explanation which follows.

With particular reference to the drawings forming a part of this specification, and wherein like numerals are applied to like parts throughout the several views: Figure 1 is a vertical elevation of one embodiment of my improved drill structure. Fig. 2 is a cross sectional view on the line 2—2 of Fig. 1. Fig. 3 is another section on the line 3—3 of Fig. 1. Fig. 4 is a diagram. Fig. 5 is a vertical section through the center of a drill illustrating another embodiment of my invention. Fig. 6 is a side elevation on the plane 6—6 of Fig. 5. Fig. 7 is a partial vertical section, similar to that of Fig. 5, and illustrates other forms of disk members that may be used in place of those shown in Figs. 5 and 6.

The head 10 of my improved drill is an approximately cylindrical casting the upper end of which is threaded for attachment to the rotary drill stem 12. In my embodiment shown in Fig. 1 the lower end of the head is inclined to one side to provide a stable mounting for an inclined cutting disk 8.

This cutter is partially housed within a slot 21 and is supported therein by a stud bolt shaft 14 having an enlarged head 15 and a reduced threaded portion 16 as shown in Fig. 2. The shaft 14 is preferably retained in position by Babbitt metal or other fusible material 22 which is cast into the under-cut recess that receives the angular head 15. This prevents the accidental unscrewing of the bolt; but it will be noted that this metal may be easily melted out by a hand torch, or cut away with a cold chisel, when it is desired to remove this member from the head. The shaft support 14 is also provided with the usual bushing 25 and washers 24 to form a cutter bearing which is removable when worn. The diameter of the disk shaped cutter is the same as that of the hole to be produced and its periphery is provided with herring-bone shaped teeth that perform the conjoint functions of shearing or shaving the material from the sides and bottom of the drill hole; of disintegrating and grinding down the larger particles of detritus thus cut away (so as to permit of its removal in suspension in the flushing stream of water supplied through the hollow drill stem); and of effecting, by the cutting action itself, a continuous revolution of the disk member on its own axial mounting thereby equalizing the wear on all parts of its toothed peripheral surface.

By mounting the disk cutter in the inclined position illustrated in the drawing the effect of the frictional "drag" on the lower edge of the disk member 8 is minimized, and this edge is permitted to roll in a circular path of small radius, instead of twisting and sliding over the material at the center of the end of the bore hole.

The teeth on the outer periphery of the disk member 8 are herring-bone shaped, and the edges of the teeth which constitute the cutting elements on the right hand portion are sloped upwardly and backwardly with respect to the direction of rotation (see Fig. 1) while the tooth edges which constitute the opposite cutting elements on the left hand side are sloped downwardly and backwardly with respect to this direction. The reaction between the inclined sides of the teeth and the material removed thereby from the opposite sides of the cup-shaped end of the bore hole—*i. e.*, the thrusts of the cut,—therefore tends to revolve the disk member in a clockwise direction—as viewed from the right hand end of the shaft support 14—when the drill is rotated in the clockwise direction indicated by the arrow in Fig. 2.

In this species of my improved type of single disk drill structure, the two opposite cutting edges of the single disk member are of slightly different diameter; and in the construction of Figs. 1 and 2 the opposed cutting edges are formed on structurally separate parts that are secured to each other by the row of screws or rivets 17, in the manner clearly shown in cross section in Fig. 2. The peripheral faces of these two parts may be either curved to fit the surface of the bore hole—as in Fig. 7—or may be made straight, as shown in Figs. 1 and 2; the diameters of the two opposite cutting edges being made mutually complementary, so as to obtain full coöperation between them in the removal and pulverizing of the material.

The head 10 is also bored, or cored out, to receive the central lubricator cup 18—which communicates with the bearing surface of the shaft support 14, through an oil duct 19—and to provide a water passage 20 leading from the interior of the hollow drill stem 12 to the slot 21 in which the disk member 8 is housed and partially shrouded.

In this form of drill construction it is important to locate the single central disk member in such position in the head that the resistances encountered by the opposite cutting edges—on the two sides of the cavity—are symmetrically balanced, so as to avoid any tendency to deflect the drill head from its longitudinal axis of rotation and thereby produce a crooked or irregular shaped bore hole. The manner in which this is done is indicated diagrammatically in Fig. 4; where the line 1—1, represents the axis of rotation of the drill head; the lines, $e$—$f$, and $e'$—$f'$, represent, respectively, the central plane and the axis of rotation of the disk member; the lines $g$—$h$, and $k$—$l$, represent the planes of the two cutting edges of that member; and the curve, $s$—$h$—$f$—$l$—$t$, represents the approximately semi-circular section of the end of a bore hole cut by the disk edges, $e$—$f$, and $k$—$l$. It is evident that the cutting duty of any unit element on either of these edges—as for example the element, $m$—varies with the vertical distance $m$—$n$ of this element above the horizontal plane bounding the lower edge of the disk member (because of the increasing radii of the horizontal circles of cut described by these elements as the height $m$—$n$ increases); and because of this a given displacement of the lower element of one cutting edge (for example the edge, $k$—$l$,) to one side of the axis of rotation, $l$—$l$, will have considerably less effect in producing a side thrust on the drill head, than will result from an equal displacement of the central portion of the opposite edge, $g$—$h$, to the other side of the said axis, $l$—$l$. In order to secure a symmetrically, or axially balanced action, the mean displacement of the plane of the edge, $g$—$h$, from the drill axis must, therefore, be less than the mean displacement of the plane of the edge, $k$—$l$, from that same axis; or, to put it more simply, the central plane, $e$—$f$, of the disk member (*i. e.*, the plane midway the planes $g$—$h$, and $k$—$l$, of the two opposite cutting edges) must intersect the axis of rotation, $l$—$l$, at a point, $r$, which is above the center of the vertical radius of the semicircle $s$—$h$—$f$—$l$—$t$; and I have found that, under most conditions, the distance of the point, $r$, below the horizontal diameter, $s$, $t$—(or below the axis, $e'$ $f'$, of the disk member)—should be between 0.3 and 0.4 of the radius of the circle, $s$—$h$—$t$;—(*i. e.*, the radius of the bore hole produced by the drill)—this distance varying somewhat with the character of the material to be drilled and also with the axial separation, $h$—$l$, of the two opposite cutting edges of the inclined disk member.

In the constructions shown of Figs. 5, 6 and 7, the main inclined disk member 8' or 8" is, as before, symmetrically positioned in the head so as to obtain a complementary balanced cutting action by the two opposite disk edges; and in these constructions the crushing and disintegrating action of the broad faced main disk is supplemented by a similar broad faced auxiliary disk, 31' or 31", which is placed at one side of the main disk and supported on the coned stud shaft 32 that is rigidly secured on the member 33, bolted to one side of the drill head, 10' or 10". The main disk member, 8' or 8", is carried on the stud shaft support 9' or 9"

which is made integral with, or is rigidly secured in, the lower forked end of the drill head; and this member is held in position on its support by the face of plate 33, which also engages the reduced end portion of the support 9' or 9''. The main and auxiliary disk members are each provided with central sleeve bushings having enlarged heads, 34 and 35, (or 34'' and 35'',) that may, if desired, be provided with engaging spurs or teeth—as shown in detailed view of Fig. 6—so as to aid each other in securing a continuous and uniform rotative movement. In this case the pitch diameters of the engaging gears are of substantially the same ratio as the mean diameters of the peripheral faces of the two disks. If gears are used they are preferably inclosed and protected from the water and loose material in the bore hole by means of a guard plate 36—shown in section in Fig. 6—which is screwed to the face of the plate 33, after the disk member, 31, is mounted thereon, and before the member, 33, is bolted to the drill head 10'.

In the two constructions last described the main disk member is made in one integral piece with herring bone teeth cut on its external periphery,—the cutting of these teeth being facilitated by the provision of a central groove 27 in the peripheral face. The auxiliary disk member, 31' or 31'', is preferably so positioned that the edges of both the main and the auxiliary disks are substantially tangent to the same surface of revolution—as shown in the cross sectional views of Figs. 5 and 7. With the arrangement last described the edge, or edges, of the auxiliary disks do not need to have any cutting action; and the peripheral faces of the said disks may, if desired, be left smooth. But these faces are preferably provided with teeth—as shown best in Fig. 6—which may be longitudinally or spirally arranged; and they may also be provided, in certain cases, with spiral grooves as shown in Fig. 7. In this last construction the double series of longitudinal and spiral grooves forms a toothed surface similar to that illustrated and described in the Hughes "cone-bit" patents (for example Nos. 979,496 and 1,143,272); and the auxiliary disk member, 31' or 31'', then becomes an effective "cone-bit" rotary member that will greatly assist the main disk member, 8' or 8'', in penetrating a hard lump of rock at the center of the bore hole, as well as supplement its action in supporting the weight of the rotating parts, and in crushing and disintegrating the loose material removed by the cutting edges.

In the operation of these rotary drills all of the main parts of the structure are subjected to excessively great stresses and strains; and must be made correspondingly large and massive and strong to effectually perform the exceptionally severe duty that is imposed upon them in drilling deep holes in hard formations. The rotatable cutting-crushing members must also be so constructed and mounted as to revolve continuously, and substantially uniformly, when the drill is in operation so as to avoid unequal wear on different portions of the cutting and crushing faces of the members; and the latter must also be so designed and arranged as to preserve as long as possible their initial shape and diameters—(so as to avoid any substantial change in the "gage" of the hole being drilled)—and to eliminate, as far as possible, any tendency to lateral displacement of the drill head from its axis of rotation. The type of construction hereinbefore disclosed—which has been designated as the "single central disk" or S. C. D. type—is admirably adapted to secure all of the above designated advantages, because it presents (1) a minimum of operative parts (in the simplest forms only three main parts); (2) a single symmetrically disposed disk member of the full size of the hole to be drilled, and having broad cutting-crushing faces that are shaped to make contact, with the material to be drilled, over substantially their entire width, and are further so shaped as to secure, by the cutting action itself, a continuous semi-positive revolution of the disk member; and (3) a symmetrically "balanced" bearing and cutting engagement between the cutting-crushing member and the cup shaped end of the bore hole, which will tend to prevent any "wabbling" or "whipping" of the rotating and revolving parts and thereby prevent the production of crooked or irregular shaped holes.

Rotary drill structures of the class herein considered must also be so constructed as to permit of the ready removal and renewal of the cutting elements, because, even under the most favorable conditions, the life of those elements is limited. In all of the forms which are presented as varying embodiments of my present invention, this important feature of construction is provided for by so mounting the disk member as to permit of its ready removal as a whole from the head.

Having thus described my invention the improvements and advantages of which will be obvious without further description, what I claim as new and desire to protect by Letters Patent is:

1. In a rotary disk drill, the combination of a head, and a rotatable disk member mounted thereon at a small angle to the axis of the head and provided with oppositely disposed cutting edges so positioned with reference to the drill axis as to exert a symmetrically balanced cutting action.

2. In a rotary disk drill, the combination of a head and a single rotatable disk member mounted in a slot approximately central of the base of the said head; the said disk member being of the full diameter of the hole and inclined at a small angle to the axis of the drill to assist in the rolling of said disk on the bottom of the hole.

3. In a rotary disk drill, the combination of a head, a rotatable disk member of a diameter substantially equal to that of the hole being drilled mounted in a slightly inclined position in one end of the head, and a smaller disk member mounted at one side of the larger disk and arranged to coöperate with the latter in supporting the weight of the rotating parts and also in disintegrating and pulverizing the material sheared from the end of the bore cavity.

4. In a rotary disk drill, the combination of a head, a rotatable disk member centrally mounted thereon at one end, and an auxiliary disk member rotatably mounted at one side of the main disk member and positively geared to the latter, substantially as described.

5. In a rotary disk drill, the combination of a head, a single large inclined cutting disk mounted thereon, and a smaller cutting and crushing disk mounted to coöperate with the larger disk in removing the material from the bottom of the hole, said large disk being the full diameter of the hole.

6. In a rotary disk drill, the combination of a head approximately cylindrical in shape and having a beveled and recessed side face, a stud mounted in the said recess, a single cutting disk mounted on the said stud in the said recess, and an outer plate secured on said beveled face and adapted to receive the end of the said stud and inclose the said cutter, said stud acting as a support for said cutter and as a securing means for said plate.

7. In a rotary disk drill, the combination of a head having a beveled and recessed side face, a cutting-crushing disk member rotatably mounted in the said recess, a plate secured against the beveled side face of the head and provided with an inwardly projecting pin, and a smaller disk member rotatably mounted on the said pin and held in position thereon by contact with the larger disk member.

8. In a rotary disk drill, the combination of a longitudinally divided head, a large disk member rotatably mounted on a pin secured to one part of the said head, a smaller disk member rotatably mounted at one side of the larger disk on a pin secured to the other part of the said head, and interconnecting spur gears secured to the two disk members and adapted to secure a synchronous rotation thereof when the drill is in operation.

9. In a rotary boring disk drill, the combination of a head, and an inclined rotatable disk member mounted in a slot in the lower end thereof in such position relative to the longitudinal axis of the head that the resistances encountered by the opposite cutting edges will be symmetrically balanced substantially as described.

In testimony whereof, I hereunto affix my signature this the 12th day of April, A. D. 1920.

FRANK L. O. WADSWORTH.